United States Patent Office 3,647,693
Patented Mar. 7, 1972

3,647,693
BASE COATINGS FOR LAUNCHING LUBRICANTS
Fred T. Crookshank, Port Arthur, Tex., assignor to
Texaco Inc., New York, N.Y.
No Drawing. Filed Jan. 6, 1969, Ser. No. 789,407
Int. Cl. C10m 5/16
U.S. Cl. 252—57                               14 Claims

ABSTRACT OF THE DISCLOSURE

This invention concerns improved and novel base coatings for launching lubricants comprising petrolatum, paraffin wax, polyalkylene polymer and an optional tall oil component.

This invention relates to novel compositions useful as ship way coatings during launching.

More particularly, this invention concerns the formulation and use of base coating compositions especially suited to undercoat the ships ways or slips and to receive an overcoating or slip coating, both coatings to be used to ease the strain on seagoing vessels' hulls during launching.

The use of lubricants to aid in the passage of ships down the ways dates to early times. It was recognized then as now that while the total time of launching even a large ship seldom exceeds a few minutes, the stresses imposed upon the hull during the launch time are extremely high and failure of the lubricant could result in the damage or even breakage of the hull.

The first ships were launched on ways greased with molten animal fats or tallows, which were overcoated with a softer fat or soap. While these coatings sufficed for many years, with the widespread construction of larger and heavier ships the demands placed upon these primitive entirely animal based coatings began to exceed their capabilities and compositions having a broader range of desirable properties were needed. For example, to be commercially attractive a base coating designed for undercoating ship's ways must possess at least the following combination of properties:

(1) The ability to withstand maximum loads during launching without squeezing out,
(2) A high resistance to brittleness and cracking,
(3) Be impervious to the attack of water particularly salt water,
(4) Have a sufficiently high melting point to resist softening even at elevated temperatures,
(5) Sufficient stability to preclude precipitation of essential components during the time interval the base coat is kept in molten state for application,
(6) The ability to form a tenacious non-sagging film having low frictional characteristics with the ways, preferably upon one application, and
(7) Compatability with a wide range of lubricating greases which are top coated onto the base coat to receive the ship.

While currently available base coats are a considerable improvement over the tallow type lubricants of earlier times, they still are deficient in certain respects. For example, many of the compositions containing gum rosins are unstable particularly at elevated temperatures as shown by the large quantities of dark colored precipitate which forms while the base coat is kept molten for application. Further, several applications of the base coating must be made to obtain the required coating thickness. In addition, the coatings soften and sag at temperatures encountered during the summertime and must be cooled with water sprays and the like to resist softening. In view of the deficiencies of the currently available base coats, there is a genuine need for improved formulations combinng the several desirable properties described above. Unexpectedly it has been found that a greatly improved base coat for ship launching ways not subject to the defects of the prior art, can be prepared from an admixture comprising major amounts of a critical ratio of a petroleum-type material to a paraffin wax, admixed with minor amounts of polyalkylene polymer and optionally a fatty-acid rosin mixture derived from tall oil.

It is an object of this invention among others to develop base coat compositions which provide an unusual combination of lubricating and ancillary properties previously unobtainable in the prior art.

A more particularly object of this invention is the development of the above base coatings possessing improved sag resistance and superior thermal and frictional properties compared to currently available comparable products.

An even more specific object of this invention is the development of a stable tall oil rosin-containing base coatings not prone to the formation of rosin sediment in the molten state as are compositions of the art containing gum-rosin.

Additional objects of this invention will suggest themselves to those skilled in the art after a further reading of this specification.

In practice, the above objects are attained through the use of a base coat formulation comprising an admixture of the following components in the proportions indicated:

(a) from about 75 to 25 parts by weight of petroleum,
(b) from about 10 to 60 parts by weight of paraffin wax
(c) from about 5 to 15 parts by weight of polyalkylene polymer, and
(d) from about 0 to 15 parts by weight of tall oil.

The aid in the understanding of the inventive concept, the following definitions and explanations are submitted:

(a) Petroleum.—This is the generic term used throughout this application to describe those highly branched solid hydrocarbon mixtures derived from petroleum refining and which are in the form of microcrystalline waxes having a retained oil content of from about 5 to 25%, a melting point in the order of 140–180° F. and higher. Further, the petrolatums have a penetration, ASTM–1321 of about 100 maximum, preferably between about 50 to 70. These petrolatums are freely available in commerce and are reasonably reproducible in wax and retained oil content.

(b) Wax.—As used throughout this application wax refers to paraffin waxes obtained as by-products in petroleum refining either relatively free from contamination or containing little or no volatile constituents. The favored waxes are those relatively hard waxes having penetrations, ASTM–1321 below 30. These waxes contain a larger proportion of crystalline to amorphous wax and have a melting point ranging from about 120–160° F. The wax may be a refined wax, a semi-refined wax or a relatively crude wax such as crude scale wax. The preferred waxes used in the base coatings of this invention are the hard white crude scale waxes or hard yellow crude scale waxes containing in the order of 0.1 to 5% oil and having a tensile strength between about 40 to 400 lbs. sq. inch.

(c) Polyalkylene polymer as defined herein includes polymers such as polyethylene, polypropylene and the polybutylenes, having a molecular weight range between about 15,000 to about 35,000. While all densities can be employed, the best results have been obtained using low to medium density polymers. Low density as used herein refers to specific gravities between 0.910–0.925, medium density between 0.926–0.940 while the high density materials have specific gravities between 0.941 and 0.965.

(d) Tall oil.—As defined this term includes those mixtures of fatty acids and rosin acids such as are obtained by fractionating the mixtures obtained from the high temperature acid digestion of pine wood. These distillates or cuts have varying physical properties and acid and rosin content. The fatty acids which can vary as to type and quantity (usually about 20-90% by weight) include oleic, linoleic, conjugated linoleic, palmitic, stearic and palmitoleic acids and higher molecular weight saturated acids such as arachidic ($C_{20}$), behenic ($C_{22}$), lignoceric ($C_{24}$), cerotic ($C_{26}$) acids, as well as smaller quantities of various higher molecular weight unsaturated and polyunsaturated acids and low-boiling monobasic and dibasic acids. The rosin acid components which ordinarily comprise from 15 to 70% by weight of the tall oil include large proportions of abietic acid, dehydroabietic acid, pimaric and palustric acids mixed with lesser proportions of neoabietic, dihydroabietic and tetrahydroabietic acids. Preferred tall oil compositions, which give especially good wettability without sedimentation, have been found to be those having a rosin acid content of about 40 to 70% by weight, a fatty acid content of about 30-55% by weight, a saponification value of 160-185 and an acid value range of from about 155-185. Two commercially available tall oil compositions which have given superior results appear below:

| Tall Oil #1—Product characteristics: | Typical range | Typical lot |
| --- | --- | --- |
| Acid value | 160–170 | 166 |
| Saponification value | 167–175 | 174 |
| Specific gravity, 25° C | .930–1.015 | 0.960 |
| Pounds per gallon, 25° C | 7.7–8.4 | 8.0 |
| Viscosity, Gardner Holdt, 25° C | Z–8+ | |
| Rosin acids content, percent | 58–62 | 60 |
| Fatty acids content, percent | 34–40 | 37 |
| Unsaponifiables content, percent | 2–4 | 3 |
| Color, Gardner, 1933 | 13–15 | 12 |

| Tall Oil #2—Product characteristics: | Typical range | Typical lot |
| --- | --- | --- |
| Color, Gardner 1933 | 7–10 | 7+ |
| Acid value | 170–180 | 172 |
| Saponification value | 170–180 | 178 |
| Iodine value (wijs) | 145–170 | 163 |
| Composition, percent: | | |
| Moisture | <0.1 | <0.1 |
| Ash | <0.1 | 0.001 |
| Rosin acid | 45–55 | 50.0 |
| Unsaponifiables | 0.5–1.5 | 1.0 |
| Fatty acids total | 45–52 | 49.0 |
| Specific gravity, 25°/25° C | 0.920–1.010 | 0.980 |
| Weight per gallon, 25° C., lbs | 7.7–8.4 | 8.2 |
| Viscosity, Gardner-Holdt, 25° C | | V |
| Viscosity, SUS, 210° F | | 105 |
| Flash point, open cup, ° F | | 400 |
| Fire point, open cup, ° F | | 440 |

Methods of analysis.—Color=ASTMD 1544-63%; Acid value, unsaponifiables, rosin acids=D803-61.

(e) Preferred Base Coating Compositions.—While all of the above-described compositions when used in the indicated proportions produce satisfactory base or undercoating for ship launchings, certain compositions employing specific components of each class employed in more critical proportions produce optimum results and are therefore preferred. These compositions comprise an admixture of:

(1) From about 60 to 50 parts by weight of a petrolatum having a melting point between about 140° and 180° F. and a penetration ASTM 1321 of less than 100;

(2) From about 20 to 40 parts by weight of a hard crude scale paraffin wax having a penetration ASTM 1321 of about 10–25 and melting between about 120° F. and 160° F. and containing about 0.1–5% by weight of oil;

(3) From about 7 to 13 parts by weight of low density polyethylene having a molecular weight range of from about 15,000 to 30,000; and (4) From about 2 to 10 parts by weight of a Tall Oil having a rosin content of about 40–65% by weight, a fatty acid content of about 30–55% by weight, a saponification value of between 160 and 185 and an acid value of between about 155–185.

(f) Method of formulating the launch lubricant of this invention.—The formulation method is not critical to success. Ordinarily, the petrolatum and wax components are added to an appropriate formulating pot or kettle equipped with heating, cooling and stirring means. The polyalkylene polymer may be included in initial charge if desired. The pot is heated to at least the melting point of the polyalkylene polymer used, usually in the order of 200–350° F., in the case of polyethylene between about 280 and 330° F. At this time, the polyalkylene polymer is added if not included in original charge and the stirring and heating continued until the mixture is completely uniform. The temperature is then dropped to about 210 to 230° F. and the tall oil is added. The stirring and heating is continued until a homogenous mixture is obtained. At this time the heating and stirring can be stopped and the mixture drawn into packages and allowed to cool for subsequent use.

(g) Grease overcoating.—The grease applied as an overcoating on top of the base coating need not be of any particular type or quality. While various additives may be present, i.e., E.P. agents, their presence is not required. Ordinarily, the most economical grade of water-resistant greases such as the cup type greases can be used. NLGI Grades 3, 4 and 5 have been found to be satisfactory.

(h) Method of employing the inventive base coat.— The base coat is applied to the ways in the molten state. One coat of base coat usually suffices and a coating between ⅛″ and ⅝″ thick is the usual range of thickness for most launches with ¼″ to ⅜″ being a workable average. Various methods may be used to apply the molten base coat. Spraying, pouring or ladling, using hand or machine means, are satisfactory.

After cooling, the slip coat or lubricant coat is applied on to of the cooled and solidified base coating until a thickness of ⅛″ to ⅜″ or more is built up. The sliding way, which has been precoated with a thin layer of base coat, is placed in position. The launching is then made in conformance with the practice of the specific yard.

In order to further aid in the understanding of the inventive concept, the following illustrative examples are submitted:

EXAMPLE I

Formulation of base coatings and determinations of optimum petrolatum to wax ratio To a suitable mixing kettle or pot provided with heating, cooling and stirring means is added 5,000 parts by weight of petrolatum having a melting point of 128°–133° F. and 3,500 parts by weight of crude scale wax. The kettle is heated to 300° F. and two materials are thoroughly mixed. At this time, 1,000 parts by weight of a low denisty polyethylene, having a molecular weight of 23,000 is added and the heated mixture is stirred until the polyethylene melts and blends in. The temperature is lowered to about 230° F. and 500 parts by weight of tall oil previously referred to as #1 is added and the four component mixture is stirred until a homogenous material is obtained. The mixture is packaged molten and samples are taken for testing.

In order to determine the effects of the petrolatum-wax ratio, formulations of base coat are prepared using the procedure described above. Table I shows the effect of varying petrolatum-wax ratios when the polyalkylene (polyethylene) is kept at the 10 parts by weight level or close to it, and the tall oil kept at the 5 parts by weight (or 5% by weight) level in all but two instances (Run 5624 has a 3.3 part by weight or percent by weight of tall oil and Run PE 472 has a 0 part by weight or percent by weight tall oil content).

Table I shows that as the petrolatum content decreases, penetration decreases indicating hardening which increases the load carrying characteristics of the base coat. At the 75 parts by weight (or percent by weight) petrolatum level, the base coat possesses borderline load-carrying characteristics. At the 50-60 parts by weight (or percent by weight) petrolatum level, all of the required characteristics are satisfactory. At the 25 parts by weight (or percent by weight) petrolatum level there is a significant drop in viscosity and sagging temperature, indicating that while the product would be satisfactory, probably more than one application of base coat would be required to build up the desired thickness.

Table IA shows the effect of varying petrolatum-wax ratios when both the tall oil and polyalkylene (polyethylene) are held constant at the 5 parts by weight (or percent by weight) level. The data indicates that while all of the compositions are useful, those having a 5% polyethylene content have somewhat lower viscosities than the compositions containing 10% polyethylene.

cated amount of tall oil with the same quantity of gum rosin having approximately 99% rosin acids by analysis. These are called Set (B). After formulation both sets are exposed to temperatures of 200-225° F. for a period of 190 hours. At that time the samples are examined and the presence or absence of sediment noted.

|  | Set A | Set B | Set A | Set B |
|---|---|---|---|---|
| Parts by weight: |  |  |  |  |
| Petrolatum | 50 | 50 | 50 | 50 |
| Crude scale wax | 35 | 35 | 35 | 35 |
| Polyethylene | 10 | 10 | 10 | 10 |
| Gum rosin or tall oil | [1] 25 | [2] 25 | [1] 5 | [2] 5 |
| Sediment after 190 hours at 200-225° F | None | [3] | None | [4] |
| Parts by weight: |  |  |  |  |
| Petrolatum | 50 | 50 | 50 | 50 |
| Crude scale wax | 35 | 35 | 35 | 35 |
| Polyethylene | 10 | 10 | 15 | 15 |
| Gum rosin or tall oil | [1] 10 | [2] 10 | [1] 15 | [2] 15 |
| Sediment after 190 hours at 200-225° F | None | [3] | None | [3] |

[1] Tall oil. [2] Gum rosin. [3] Very heavy. [4] Heavy.

NOTE.—The above data shows that replacing the gum rosin component with tall oil eliminates the objectionable sediment which forms when the gum rosin is used.

TABLE 1.—EFFECT OF PETROLATUM-WAX RATIO

| Batch number | 5610 | 5622 | 5608 | 5641 | 1336 | 5651 | 5652 | 5605 | 5640 | 5606 | 5653 | 5657 | 5624 | 1340 | 5472 | PE 472 |
|---|---|---|---|---|---|---|---|---|---|---|---|---|---|---|---|---|
| Composition, percent by weight: | | | | | | | | | | | | | | | | |
| Petrolatum | 85 | 85.5 | 75 | 75 | 75 | 60 | 60 | 50 | 50 | 50 | 50 | 50 | 48.4 | 37.5 | 25 | 52.9 |
| Crude scale wax | | | 10 | 10 | 10 | 25 | 25 | 35 | 35 | | 35 | 35 | 38.7 | 47.5 | 60 | 37.1 |
| Tall oil | 5 | 5 | 5 | 5 | 5 | 5 | 5 | 5 | 5 | 5 | 5 | 5 | 3.3 | 5 | 5 | |
| Polyethylene | 10 | 9.5 | 10 | 10 | 10 | 10 | 10 | 10 | 10 | 10 | 10 | 10 | 9.7 | 10 | 10 | 10 |
| Refined wax | | | | | | | | | | 35 | | | | | | |
| Test results, penetration, ASTM 1321 at— | | | | | | | | | | | | | | | | |
| 77° F | 34 | 36 | 35 | 26 | 29 | 19 | 22 | 20 | 17 | 22 | 16 | 14 | 17 | 15 | 14 | 15 |
| 90° F | | | | | | | | | 49 | | | 51 | | | | |
| 100° F | | | | | | 68 | 66 | | | | 70 | 72 | | | | |
| 105° F | | | | | | | | | | | | | | | | |
| 110° F | | | | | | 103 | 97 | | | | 126 | 109 | | | | |
| 115° F | | | | | | 120 | 127 | | | | 142 | | | | | |
| 120° F | | | | | | | | | | | | | 197 | | | |
| 125° F | | | | | | | | | | | | | | | | |
| 130° F | 175 | 139 | 189 | 188 | | 230 | 203 | 244 | 243 | 255 | 300 | 300+ | 300+ | | | 300+ |
| 140° F | | | | | | | | | | | | | | | | |
| Melting point, °F., ASTM-127 | 206 | 202 | 202.5 | 205 | 206 | 203.5 | 202.5 | 202.5 | 202 | 202.5 | 201.5 | 205.5 | 200 | 204 | 198 | 203 |
| Viscosity, SUS at 210° F | | ([1]) | | | | 2,556 | 2,742 | | | ([1]) | | 2,215 | 1,941 | 1,756 | 1,462 | 154.4 | 2,300 |
| Compression test load, p.s.i. at— | | | | | | | | | | | | | | | | |
| First sign of yield | [2] 49.5 | 60.1 | 30.1 | | | 60.1 | 60.1 | 60.1 | | 60.1 | 60.1 | | | | 60 | 60.1 |
| Definite yield | 60.1 | 60.1 | 88.4 | | | 67.2 | 77.8 | 99.0 | | 99.0 | 99.0 | | | | 110 | 99.0 |
| Sagging test: | | | | | | | | | | | | | | | | |
| OK temperature, °F | [2] 208 | | | | | 203 | 203 | 208 | | 208 | 203 | 200 | | | 190 | 208 |
| Sagging temperature, °F | 218 | | | | | 212 | 212 | 218 | | 218 | 212 | 209 | | | 208 | 212 |

[1] Too viscous.
[2] Base coat will not adhere to wood base.

TABLE 1A.—EFFECT OF PETROLATUM-WAX RATIO, 5% POLYMER

| Batch number | 5609 | 1335 | 1337 | 1338 | 5607 | 1339 | 5466 | 5478 | 5469 | 5491 | 5490 |
|---|---|---|---|---|---|---|---|---|---|---|---|
| Composition, percent by weight: | | | | | | | | | | | |
| Petrolatum | 75 | 75 | 60 | 50 | 50 | 37.5 | 25 | 25 | 25 | 20 | 20 |
| Crude scale wax | 15 | 15 | 30 | 40 | 40 | 52.5 | | | | | |
| Refined wax | | | | | | | 65 | 65 | 65 | 70 | 70 |
| Tall oil | 5 | 5 | 5 | 5 | 5 | 5 | 5 | 5 | 5 | 5 | 5 |
| Polyethylene | 5 | 5 | 5 | 5 | 5 | 5 | 5 | 5 | 5 | 5 | 5 |
| Test results penetration, ASTM 1321 at— | | | | | | | | | | | |
| 77° F | 42 | 36 | 27 | 27 | 25 | 19 | 13 | 16 | 17 | 16 | 17 |
| 90° F | | | | | | | 78 | 79 | 75 | | |
| 100° F | | | | | | | | | | | |
| 105° F | | | | | | | | | | | |
| 110° F | | | | | | | | | | | |
| 115° F | | | | | | | | | | | |
| 120° F | | | | | | | 198 | 217 | 189 | | |
| 125° F | | | | | | | | | | | |
| 130° F | 300+ | | | | 300+ | | 300+ | 300+ | 300+ | | |
| 140° F | | | | | | | | | | | |
| Melting point, °F., ASTM-127 | 200 | 204 | 202 | 205 | 195 | 199.5 | 198 | 196 | 196 | 194 | 194 |
| Viscosity, SUS 210° F | | 525 | 401 | 363 | | 289 | 249 | 234 | 186.4 | 242 | 234 |
| Compression test load, p.s.i. at— | | | | | | | | | | | |
| First sign of yield | | | | | 63.7 | | | 30 | 99 | | |
| Definite yield | | | | | 99.0 | | | 99 | 134 | | |
| Sagging test: | | | | | | | | | | | |
| OK temperature, °F | | | | | 200 | | | | | | |
| Sagging temperature, °F | | | | | 208 | | | | | | |

EXAMPLE 2

Effect of replacing tall oil rosin with gum rosin

In this example, formulations containing the tall oil, petrolatum, wax and polyethylene of Example 1 are prepared using the formulation procedure of that example. These formulations are referred to as Set (A). Using the same procedure, and petrolatum wax and polyethylene as in Set (A), formulations are made up replacing the indi-

EXAMPLE 3

Varying polyethylene content in formulation

In this example base coat formulations are prepared using the procedure of Example 1. The identical petrolatum, crude scale wax and polyethylene of Example 1 are used. The tall oil designed #2 is employed in place of the tall oil of Example 1.

| Sample | 1 | 2 | 3 | 4 | 5 |
|---|---|---|---|---|---|
| Components, parts by weight: | | | | | |
| Petrolatum | 60 | 60 | 60 | 60 | 60 |
| Crude scale wax | 30 | 30 | 30 | 30 | 30 |
| Polyethylene | 2 | 5 | 10 | 15 | 20 |
| Tall oil #2 | 5 | 5 | 5 | 5 | 5 |

All of the above samples gave no sediment upon storage for 190 hours at 200–225° F. and all but the 2 parts by weight (Sample 1) and the 20 parts by weight sample of polyethylene (Sample 5) had satisfactory melt, compression and viscosity values. Sample 1 had lower viscosity than desirable and Sample 5 had too high a viscosity.

EXAMPLE 4

Utilization of a preferred base coating in an actual ship launching

A quantity of the base coating whose preparation is described in Example 1 is heated to 300° F.–350° F. and applied in a single application by hand pouring on the nine (9) standing ways and nine (9) skids used in a shipyard to launch a U.S. Coast Guard Cutter having the following specifications:

Length—378′0″
Beam—42′0″
Displacement at 13′6″—2,716 tons
Total H.P.—36,000 H.P.
Average P.S.I.—load-on lubricants 22 p.s.i.
Launch weight—(approx.) 1,900 tons The single cooled application of base coating varied between ⅛″ and ¼″ thickness. A ¼″ to ½″ thick application of #3 grade launching grease was made as a top or skid coating upon the base coating. The launching went off without incident and inspection of all ways after launch revealed no movement, peeling, curling or rupture of the base coating. Furthermore, it was unnecessary to protect the base coated ways following the launch due to excellent sag resistance of the coat. With other base coats the ways would have to be cooled with sprays to prevent sagging of the coat. Also, it was observed that the ways were smoother and slicker than with previous products. Under tidal[1] conditions the coated ways must be kept cool to prevent water vapor from blistering the coat.

As the preceding description and examples have indicated, the novel base coating of this invention are advantageous and give unexpected results compared to the gum-rosin and petrolatum wax based compositions of the prior art.

For example, the base coating compositions of this invention form thicker and more tenacious films, having higher-melting points and superior sag resistance to the comparable compositions of the prior art. These characteristics permit thicker and stronger films to be formed in one application without the necessity of building up successive layers in repeated applications and enable the base coat to withstand maximum loading even under the direct rays of the summer sun and elminate the need for extensive way protection after the launch.

In addition, the novel compositions of this invention have the good wetting characteristics usually associated with base coats containing gum rosins without the propensity toward sedimentation that compositions containing gum-rosins are known to possess. Further, the process for preparing the compositions is quite simple and does not require any critical conditions or unusual compounding conditions.

[1] That is when the ways are used to launch into tidal waters and are, therefore, partly covered with water part of the time and exposed to the heat of the sun part of the time.

The results obtained through the use of the compositions of this invention are also quite unexpected. For instance, while the rosin acids contained in gum rosin and tall oil are generally recognized to be very similar, much less sedimentation is encountered using tall oil as the rosin source rather than gum rosins. This is true even when the same amount of tall oil rosin is used as gum rosin. In addition it was unexpected that the ratio of wax to petrolatum would be critical in obtaining superior results. Finally, the use of polyalkylene polymers such as polyethylene in relatively small proportions produced an unexpectedly large improvement in the desired physical characteristics of the base coat compositions.

Numerous changes, modifications and substitutions can be made in components, proportions and process conditions without departing from the inventive concept. The metes and bounds of this invention are best determined by the claims which follow read in conjunction with the specification.

What is claimed is:
1. A base coating composition suited to coat ships' ways and to receive a top coating of launching lubricant, comprising an admixture of the following components in the proportions indicated:
  (a) from about 75 to 25 parts by weight of petrolatum having a retained oil content of from about 5 to 25% and a melting point of 140° to 180° F. and higher, and a penetration (ASTM–1321) of 100 maximum;
  (b) from 10 to 60 parts by weight of paraffin wax having a penetration (ASTM–1321) of below 30 and a melting point ranging from 120–160° F.;
  (c) from about 5 to 15 parts by weight of polyalkylene polymer having a molecular weight range between about 15,000 to about 35,000 and a specific gravity between about 0.910 to about 0.965;
  (d) from about 2 to 10 parts by weight of tall oil having a rosin acid content of about 40% to 70% by weight.
2. The composition of claim 1 wherein the polyalkylene polymer is polyethylene.
3. The composition of claim 2 wherein the petrolatum has a penetration (ASTM–1321) of between about 50 to 70.
4. The composition of claim 3 wherein the paraffin wax is crude scale wax having a melting point between 120° F. and 160° F. containing in the order of 0.1% to 5% oil, and a penetration (ASTM–1321) of about 10 to 25.
5. The composition of claim 2 wherein the polyethylene is low-to-medium density having a molecular weight of 15,000 to 35,000.
6. The composition of claim 1 wherein the petrolatum to paraffin wax content varies between about 65 to 45 parts by weight of petrolatum to about 20 to 40 parts by weight of paraffin wax.
7. The composition of claim 6 wherein from 5 to 10 parts by weight of tall oil are included therein.
8. The composition of claim 7 wherein the polyalkylene content is between about 7 to 13 parts by weight of low density polyethylene having a molecular weight range of from about 15,000 to 30,000 and the paraffin wax is a crude scale wax having an oil content between 0.1 to 5 weight percent.
9. The method of applying a base coat to ship's ways suitable for receiving a slip coat comprisin:
  (a) heating a base coating admixture comprising from 75 to 25 parts by weight of petrolatum having from about 10 to 60 parts by weight of paraffin wax having a penetration below 30 and a melting point ranging from 120–160° F., from 5 to 15 parts by weight of polyalkylene polymer having a molecular weight range between about 15,000 to about 35,000, and from about 2 to 10 parts by weight of tall oil having a rosin acid content of about 40% to 70% by weight to a temperature between 200° to 350° F. until the mixture reaches the fluid state,

(b) then applying said base coat fluid to the ships' ways and in sufficient amount to produce a coating of from about 1/4" to 3/8" thick, and allowing said fluid coating to cool to a solid base coat.

10. The method of claim 9 wherein the base coating is heated to between about 280° F. and 330° F.

11. The method of claim 10 wherein the polyalkylene polymer is a low to medium density polyethylene having a specific gravity between about 0.910–0.940 and the paraffin wax is crude scale wax.

12. The method of claim 11 wherein the tall oil content ranges from about 2 to 10 parts by weight.

13. A process for formulating a base coating suitable for coating ship's ways, comprising admixing:
(I) (a) from about 75 to 25 parts by weight of petrolatum containing 5 to 25% of retained oil and having a melting point of 140–180° F. and higher, said petrolatum having a penetration of 100 maximum;
(b) from about 10 to 60 parts by weight of paraffin wax having penetrations below 30 and having a melting point ranging from about 120–160° F.; (c) from about 5 to 15 parts by weight of polyalkylene polymer having a molecular weight range from about 15,000 to about 35,000, said polymers having specific gravities from between about 0.910 to 0.965, to form an admixture, and
(II) heating said admixture between about 200 to 350° F. and stirring the heated admixture until the mixture is completely uniform; dropping the temperature between about 210 to 230° F. and adding 2 to 10 parts by weight of a tall oil component having a rosin acid content of about 40 to 70% by weight, and continuing the heating and stirring at said 210–230° F. until a homogenous base coating mixture is obtained, then cooling for subsequent use.

14. The process of claim 13 wherein the polyalkylene polymer is polyethylene which has a specific gravity ranging from 0.910 to 0.940.

References Cited

UNITED STATES PATENTS

| | | | |
|---|---|---|---|
| 2,177,729 | 10/1939 | Loane | 252—59 |
| 2,298,844 | 10/1942 | Schilling | 252—59 |
| 2,565,938 | 8/1951 | Williams | 252—56 |
| 2,731,453 | 1/1956 | Fields | 252—59 |
| 2,762,775 | 9/1956 | Foehr | 252—59 |
| 3,012,981 | 12/1961 | Padlipnik | 252—56 |
| 3,080,330 | 3/1963 | Rudel et al. | 252—59 |
| 3,112,297 | 11/1963 | Gordon et al. | 252—59 |
| 3,258,319 | 6/1966 | Cox | 252—59 |
| 3,269,943 | 8/1966 | Armstrong et al. | 252—12 |

DANIEL E. WYMAN, Primary Examiner

I. VAUGHN, Assistant Examiner

U.S. Cl. X.R.

61—67; 117—147, 149; 252—59